United States Patent [19]

Yamamoto et al.

[11] Patent Number: 5,248,762
[45] Date of Patent: Sep. 28, 1993

[54] PROCESS FOR PREPARING CYCLIC POLYOXYMETHYLENE

[75] Inventors: Kaoru Yamamoto; Toshio Shiwaku, both of Fuji, Japan

[73] Assignee: Polyplastics Co., Ltd., Osaka, Japan

[21] Appl. No.: 844,583

[22] PCT Filed: Aug. 15, 1991

[86] PCT No.: PCT/JP91/01089
§ 371 Date: Mar. 30, 1992
§ 102(e) Date: Mar. 30, 1992

[87] PCT Pub. No.: WO92/03487
PCT Pub. Date: Mar. 5, 1992

[30] Foreign Application Priority Data

Aug. 21, 1990 [JP]  Japan .................................. 2-220773

[51] Int. Cl.$^5$ ................................. C08F 6/00
[52] U.S. Cl. ........................ 528/489; 528/230; 528/233; 528/237; 528/239; 528/241; 528/243; 528/488; 528/491; 528/496; 528/499; 528/503; 525/472; 524/178; 524/183; 524/202
[58] Field of Search ............... 528/230, 233, 239, 237, 528/241, 243, 488, 489, 491, 496, 499, 503; 525/472; 524/178, 183, 202

[56] References Cited

U.S. PATENT DOCUMENTS

| | | | |
|---|---|---|---|
| 4,691,000 | 9/1987 | Collart et al. | 528/244 |
| 4,975,519 | 12/1990 | Yang et al. | 528/230 |
| 5,144,005 | 9/1992 | Sextro et al. | 528/480 |

*Primary Examiner*—Samuel A. Acquah
*Attorney, Agent, or Firm*—Nixon & Vanderhye

[57] ABSTRACT

Cyclic polyoxymethylene having a number-average molecular weight of 500 to 5,000 is obtained by solid state cyclization reaction of an alkalidegradative linear oxymethylene homopolymer in the presence of a medium containing a cationic catalyst.

The cyclization is effected at 10° to 150° C. for 1 to 500 minutes in an organic liquid medium.

The reaction mixture obtained by the cyclization is treated with an alkaline medium to hydrolyze and remove away unreacted linear polyoxymethylene homopolymer, and isolate the cyclic polyoxymethylene.

The product has a sharp molecular weight distribution and is useful as a resin improver.

6 Claims, No Drawings

PROCESS FOR PREPARING CYCLIC POLYOXYMETHYLENE

FIELD OF INVENTION

The present invention relates to a novel process for preparing a cyclic polyoxymethylene having a relatively narrow molecular weight distribution. The polymer can be used as a useful material for plastic additives to improve self-lubrication, wear resistance and appearance of molded articles, as a starting material for synthesis of segments of a new copolymer, and as an intermediate for preparation of various compounds.

BACKGROUND AND SUMMARY OF INVENTION

Linear oxymethylene polymers or copolymers having repeating oxymethylene units ($-CH_2O-$) are well known. The process for preparing such polymers or copolymers is roughly divided into two processes, the first being a polymerization process using anhydrous formaldehyde as the main monomer, while the second being a polymerization process using a cyclic acetal (e.g. trioxane, a cyclic trimer of formaldehyde) as the main monomer.

The polymerization or copolymerization of substantially anhydrous formaidehyde in the presence of an anionic or cationic catalyst has been proposed as the first process, and a process for polymerizing or copolymerizing a low cyclic acetal as the main monomer, such as trioxane, in the presence of a cationic catalyst has been practiced as the second process.

Generally, a polymer or copolymer prepared by such processes has a linear structure and a broad molecular weight distribution, and has been widely used as materials for engineering plastics.

Apart from such linear oxymethylene polymers, the inventors have found that a specific macrocyclic polyoxymethylene which has a relatively small molecular weight distribution and a molecular weight not more than 5000 can be obtained as a part of products in a cationic polymerization of a cyclic monomer such as trioxane. A technique to isolate the cyclic polymer was established also by the same inventors and proposed in Japanese Provisional Publication No. 55712/1990. However, in such a case, it is not economical to isolate the desired cyclic polymer in a large amount without investment of additional polymerization equipment because the desired macrocyclic polymer is produced in a small amount as a by-product during the polymerization process of trioxane or the like.

It has now been found that when a conventional linear oxymethylene polymer is treated with a cationic catalyst, there is obtained a cyclic polyoxymethylene polymer which is stable to alkali and has a relatively large ring structure (number average molecular weight being 500 to 5,000) and has no terminal groups.

The present invention is related to a process for preparing a cyclic polyoxymethylene which comprises subjecting an alkali-degradative linear polyoxymethylene homopolymer to a solid state cyclization reaction by treating it with a medium containing a cationic catalyst to thereby provide a cyclic polyoxymethylene having a number average molecular weight of 500 to 5,000, and treating the resultant reaction mixture with an alkaline medium to remove the unreacted linear polyoxymethylene homopolymer by hydrolysis to thereby isolate the desired cyclic polyoxymethylene.

The cyclic polyoxymethylene obtained by a process of the present invention is a specific polyoxymethylene having a relatively large ring structure (number average molecular weight of 500 to 5,000) and no terminal group, and is represented as the following general formula:

$$(CH_2O)_n$$

wherein n = 17 to 170

According to test obtained by means of NMR, infrared spectrophotometry, and GPC as well as a hydrolytic cleavage test by alkali, the cyclic polymer formed by the process of this invention has a relatively large ring structure, no terminal group and a relatively narrow molecular weight distribution.

DETAILED DESCRIPTION OF THE PREFERRED EMBODIMENTS

A preferred process for preparing the cyclic polyoxymethylene of the present invention will now be described in detail.

The preferred raw material used in the present invention is an alkali-degradative oxymethylene homopolymer. An oxymethylene comonomer is not suitable in such a case because the linear copolymer is stable to alkali and unable to be decomposed by an alkali treatment of the resulting reaction mixture containing the unreacted linear copolymer, and is unable to be separated from the cyclic polymer.

Similarly, a linear homopolymer having both terminals protected with groups stable to alkali is also not suitable for the same reason. Any alkali-degradative oxymethylene homopolymer may thus be employed as a raw material used in the present invention. An example of one such usable homopolymer is a commercially availabie homopolymer having terminal groups protected with ester groups such as acetyl groups wherein the homopolymer can be cleaved by alkali.

When the homopolymer meets the above-mentioned requirements, any oxymethylene homopolymer such as those prepared by the cationic polymerization of trioxane or by an anionic polymerization of formaidehyde may be employed as a starting material of the present invention.

The process of the present invention is especially characterized in that a linear polyoxymethylene homopolymer is treated with a medium containing a cationic catalyst while the inherent crystalline state of the homopolymer is maintained. It was quite unexpected that such treatment of a crystalline linear oxymethylene polymer yields a cyclic product having a relatively large ring structure through a cyclization reaction. The present invention thus makes such a reaction possible for the first time.

In order to carry out the cyclization reaction efficiently by intimate contact of the oxymethylene homopolymer with a cationic catalyst while the inherent crystalline state of the homopolymer is maintained, it is preferable to employ the homopolymer in the form of finely divided particles in a medium, with the more preferred form being a suspension of minute particles.

Any medium may be employed provided it is inactive to a cationic catalyst. Examples of usable media include aliphatic hydrocarbons such as cyclohexane, aromatic hydrocarbons such as toluene, halogenated hydrocarbons such as methylene chloride and mixtures thereof. The amount of the medium should be sufficient to immerse the polymer feed, with the preferred amount being sufficient to provide a homogeneous stirring or mixing of the reactants.

In the process according to the present invention, a cationic catalyst is employed for the cyclization reaction. Examples of such catalyst include Lewis acids, that is, halogenated boron, tin, titanium, phosphorus, arsenic, antimony and the like, especially $BF_3$, $SnCi_4$, $TiCi_4$, $PCl_5$, $PF_5$, $AsF_5$, $SbF_5$, and complexes or salts thereof; a proton acid such as trifluoromethane sulphonic acid, perchloric acid, esters of a protonic acid, especially esters of perchloric acid and a lower fatty alcohol such as tert.-butyl ester of perchloric acid; proton acid anhydride, especially a mixed anhydride of perchloric acid and a lower aliphatic carboxylic acid such as acetyl perchiorate; isopoly acids; heteropoly acids such as phosphorus molybdate; triethyloxonium hexafluorophosphate, triphenylmethyl hexafluoroarsenate; acetylhexafluoroborate and the like. Among them, $BF_3$ or coordination compounds of $BF_3$ with an organic compound is most preferred.

Although the reaction conditions such as the treating temperature, the treating duration, the catalyst concentration, the concentration of polymer feed and the like cannot absolutely be stated because they are related to each other, the treating temperature range is between 10° and 150° C., with the preferred range being between 20° and 130° C., the treating duration range is between 1 and 500 minutes, with the preferred range being between 5 to 200 minutes, the catalyst concentration range is between 0.05 and 10% by weight of the polymer feed, with the preferred range being between 0.1 and 5% by weight, and the polymer concentration range in a medium is between 1 and 50% by weight, with the preferred range being between 2 and 30% by weight.

The rate of decomposition reaction is more accelerated with increasing severity of the reaction conditions for the cyclization reaction resulting in a poor yield of the cyclic product. Further, the milder the conditions become, the more the reaction duration is prolonged.

The addition of a deactivator for the cationic catalyst forces the reaction to completion. Examples of the deactivator include ammonia; amines such as triethylamine, tri-n-butylamine and the like; hydroxides of alkali metals or alkali earth metals; and conventional deactivators for cationic catalyst. The deactivator may be added in the original form or in a form of solution while stirring is taking place to thereby neutralize and deactivate the catalyst. In this way, the resulting reaction mixture contains the unreacted linear oxymethylene homopolymer with the desired cyclic polyoxymethylene, which is produced from a part of the homopolymer feed by the cyclization reaction, the former being recovered from the resulting reaction mixture by a suitable method.

The preferable process for recovery of the cyclic product from the resulting mixture is a process comprising decomposing the unreacted linear oxymethylene polymer by treating the mixture with an alkaline medium which is separately provided. That is, the separation process comprises the steps of separating the mixed polymer from the cyclization medium, contacting the resulting mixture with an alkaline medium, such as water and/or an organic solvent containing an alkaline material, with the preferred material being those soluble to the medium employed.

Although it may be possible to replace the alkaline medium by the aforesaid medium for cyclization to which the alkaline material has been added beforehand to hydrolyze the unreacted homopolymer, it is preferred to provide the alkaline medium separately, because the suitable medium for cyclization does not always suit hydrolysis. Examples of the alkaline material include strongly basic hydroxides such as alkali metal hydroxides or alkaline earth metel hydroxides; salts of a strong base with a weak acid; and ammonia or organic bases such as amines and amidines and the like. More specifically, examples of such alkaline material include caustic soda, caustic potash, sodium carbonate, sodium acetate, ammonium hydroxide, triethanolamine, triethylamine, tripropylamine, tetramethyl guanidine, and the like.

The most convenient medium used for decomposition of the unreacted linear oxymethylene polymer is water, but primary-, secondary- and tertiary-alcohols may be employed as a part of the medium or the main medium. Examples of such organic alcohol include aliphatic alcohols having 1 to 20 carbon atoms such as methyl alcohol, ethyl alcohol, n-propyl alcohol, isopropyl alcohol, isobutyl alcohol, anyl alcohol, lauryl alcohol, and the like. Examples of the other usable alcohol include aromatic alcohols, preferably those having 1 to 20 carbon atoms such as benzyl alcohol, α-phenyl ethyl alcohol, diphenylcarbitol, and the like; cyclic aliphatic alcohols, especially those having 1 to 20 carbon atoms such as 1,2-dimethylcyclopentane-1,2-dioi, 1-methylcyclohexyl alcohol and the like; polyvalent alcohols, especially those having 1 to 20 carbon atoms such as ethylene glycol, glycerol, and the like.

The alkaline medium thus provided has a pH of 7.0 or more with 8.0 or more being preferred.

The preferred hydrolysis temperature range is between 90° and 220° C., with the more preferred range being between 130° and 200 ° C.

Although the pressure depends on the temperature and the kind of medium employed, atmospheric pressure as well as a relatively high pressure may be employed.

The treatment by the alkaline medium may be conducted in either the heterogeneous or the homogeneous mode, which depends upon the temperature and the kind of medium employed. That is, when water or an aqueous medium comprising mainly water is employed, or when a relatively low temperature is employed, the system will be a heterogeneous mode. In such case, the unreacted linear polyoxymethylene homopolymer which is present in the resulting mixed polymer can be completely decomposed by treatment with the alkaline medium to thereby provide formaldehyde which is dissolved in the alkaline medium and removed from the system.

When a relatively high temperature, or a medium which can dissolve all of the mixed polymers is employed, the system will be a homogeneous mode. In such case, all of the resulting mixed polymers are treated in a homogeneous solution to thereby decompose, at first the terminal groups, and then the whole unreacted linear oxymethylene polymer in a short period of time.

Formaldehyde, thus produced, is dissolved in the medium. The desired cyclic polyoxymethylene which exists in the medium without being cleaved can be isolated from the system by precipitating it by cooling or addition of a nonsolvent.

Naturally, the treatment in the heterogeneous mode requires a long period of time to complete the decomposition, whereas the homogeneous mode requires a short period of time.

Although the amount of the alkaline medium can be varied widely depending on the amount of the polymer feed, the kind of the alkaline material employed, pH of the material and the conditions of hydrolysis, it should be in a sufficient amount to immerse the mixed polymer entirely.

The alkaline medium can selectively decompose the unreacted linear polymer while the decomposition of the cyclic polymer is depressed by neutralization of the cationic catalyst, which can decompose even the cyclic product. When acidic medium is used, it is difficult to obtain the desired cyclic product because said acidic medium can decompose the cyclic polymer as well.

Although the duration range required for hydrolysis varies depending on the properties of the medium employed, the hydrolysis conditions, the mode of hydrolysis, the properties of polymers, it is generally between about 0.2 minutes and about several hours, with the preferred range being between 1 about 120 minutes.

After completion of hydrolysis, the cyclic polymer is removed from the medium and cooled or washed with a large amount of nonsolvent followed by drying, if necessary.

The cyclic polyoxymethylene thus obtained has a number average molecular weight ($\overline{Mn}$) of 500 to 5,000 and a molecular weight distribution with a single peak.

According to the analyses by means of NMR and infrared spectrophotometry, the cyclic polymer has no terminal group. Moreover, the cyclic polymer is stable to hydrolytic cleavage by alkali. Therefore, these results provide conclusive proof that the cyclic polymer has a ring structure.

From the $\overline{Mw}/\overline{Mn}$ ratio of the main component, the cyclic polymer of the present invention is supposed to have a relatively narrow and uniform molecular weight distribution.

A cyclic polyoxymethylene having a number average molecular weight of 500 to 5,000 and a large ring structure can be obtained by a relatively simple procedure. The cyclic product is expected to be widely used as a material component for improving the properties of resins, and as an intermediate for syntheses of various chemicals or new polymers.

EXAMPLES

The following non-limiting examples will further illustrate the present invention.

Examples 1 to 3, Comparative Example 1

A ground linear polyoxymethylene homopolymer listed in Table 1 was added to a reactor fitted with a stirrer, mixed with a specific medium containing a dissolved specific cationic catalyst shown in Table 1. Cyclization was conducted at a temperature for a period of time as specified in Table 1. After filtration to remove the reaction medium, a medium containing an alkaline material was fed to the resulting polymer mixture to neutralize and deactivate the cationic catalyst while treating was carried out at a temperature for a period of time to thereby decompose the unreacted linear polyoxymethylene, followed by cooling, filtration to collect the precipitate of the cyclic polyoxymethylene, and drying after washing of the precipitate with acetone.

The following characteristic value ws measured by the following method for the obtained polymer.

1) Molecular weight

In GPC (solvent; hexafluorotin propanol, at 40° C.), number average molecular weight (Mn) and weight average molecular weight (Mw) were determined by means of GPCLALLS (low-angle laser light scattering detector) and from calibration curves with polytetrahydrofuran as a standard sample.

2) Terminal Groups: by means of 1H-NOR

The precipitate was subjected to the above-described tests.

According to the spectral tests by means of 1H-NNR and infrared spectrophotometry, any indication of existence of a terminal group in the chemical structure of the samples was not found through the infrared spectrum, except for the signal of proton at 4.97 ppm in 1H-NNR spectrum which shows the existence of the $-CH_2O-$group.

In order to judge by comparison, the same linear oxymethylene homopolymer was subjected to a hydrolytic cleavage test with the same alkaline medium without treatment with the cationic catalyst in advance. All of the polymer was decomposed by the alkaline medium.

The conditions of the treatment and the properties of the cyclic polymers obtained in examples are set forth in Table 1.

The polymer feeds used in examples are as follows:
A: Hydroxy-terminated polyoxymethylene homopolymer having a number average molecular weight of about 55,000 B: Acetyl-terminated polyoxymethylene homopolymer having a number average molecular weight of about 36,000

TABLE 1

| Polymer Feeds (% by wt.) | Example 1<br>A (100) | Example 2<br>A (100) | Example 3<br>B (100 | Comparative<br>Example 1<br>A (100) |
|---|---|---|---|---|
| Cyclization Reaction | | | | |
| Catalyst (parts by wt.) | BF₃/butyl etherate<br>(0.5) | BF₃/butyl etherate<br>(10.5) | SnCl₄ (1) | — |
| Medium (parts by wt.) | Cyclohexane (2000) | n-Octane (1000) | Cyclohexane (2000) | — |
| Temperature (°C.) | 60 | 30 | 100 | — |
| Duration (min.) | 30 | 200 | 5 | — |
| Decomposition of<br>Unreacted Linear Polymer | | | | |
| Alkaline Material<br>(% by wt., based<br>on medium) | Ammonium Hydroxide<br>(0.5) | Ammonium Hydroxide<br>(0.5) | Triethylamine<br>(0.5) | Ammonium Hydroxide<br>(0.5) |
| Medium (parts by wt.) | H₂O:Methanol = | H₂O:Methanol = | H₂O:Methanol = | H₂O:Methanol = |

TABLE 1-continued

| Polymer Feeds (% by wt.) | Example 1<br>A (100) | Example 2<br>A (100) | Example 3<br>B (100 | Comparative<br>Example 1<br>A (100) |
|---|---|---|---|---|
| | 1:1 (5000) | 1:1 (5000) | 1:1 (5000) | 1:1 (5000) |
| Temperature (°C.) | 170 | 190 | 170 | 170 |
| Duration (min.) | 15 | 5 | 25 | 15 |
| Cyclic Substance obtained | | | | |
| $M_n$ | 2000 | 2200 | 2000 | All polymers |
| $M_2/M_n$ | 1.4 | 1.2 | 1.5 | were decomposed |
| Terminal Group | None | None | None | |
| Yield<br>(% by wt., based<br>on polymer feed) | 17 | 20 | 10 | 0 |

We claim:

1. A process for preparing a cyclic polyoxymethylene having a number-average molecular weight of 500 to 5,000 wherein said process comprises solid state cyclization reaction of an alkalidegradative linear oxymethylene homopolymer in the presence of a medium containing a cationic catalyst.

2. A process according to claim 1, wherein said cyclization reaction is carried out at a temperature of 10° to 150° C. for 1 to 500 minutes in an organic liquid medium.

3. A process for preparing a cyclic polyoxymethylene, wherein said process comprises treating the reaction mixture obtained by the cyclization reaction according to claim 1 with an alkaline medium to hydrolyze the unreacted linear polyoxymethylene homopolymer, removing the hydrolyzed homopolymer and isolating the cyclic polyoxymethylene.

4. A process according to claim 3, wherein said alkaline medium is a liquid having a pH of 8 or more and comprised mainly of water, alcohol or mixtures thereof, and a small amount of alkaline material.

5. A process according to claim 3, wherein said treatment of unreacted oxymethylene homopolymer with an alkaline medium is carried out at a temperature of 130° to 200° C. for 1 to 120 minutes.

6. A process according to claim 1, wherein said cyclic polyoxymethylene has a main chain with a ring structure consisting essentially of oxymethylene structural units, a number average molecular weight of 500 to 5,000 a molecular weight ratio Mw/Mn molecular weight, and Mn is number average molecular of 1.0 to 2.0, wherein Mw is weight average molecular weight and Mn is number average molecular weight, and wherein said cyclic polyoxymethylene has substantially no terminal groups.

* * * * *

UNITED STATES PATENT AND TRADEMARK OFFICE
CERTIFICATE OF CORRECTION

PATENT NO.   :  5,248,762
DATED        :  September 28, 1993
INVENTOR(S)  :  Yamamoto et al Page 1 of 2

It is certified that error appears in the above-indentified patent and that said Letters Patent is hereby corrected as shown below:

ABSTRACT, line 10, after "move" delete "away".

Column 1, line 28, delete "formaidehyde" and insert --formaldehyde--;
         line 57, after "is" insert --alkali-- and after "stable" delete "to alkali".

Column 2, line 15, after "to" delete "test" and insert --tests--;
         line 41, change "availabie" to --available--.

Column 3, line 12, change "SnCi " to --SnCl --;
         line 13, change "TiCi " to --TiCl --;
         line 20, change "perchiorate" to --perchlorate--.

UNITED STATES PATENT AND TRADEMARK OFFICE
CERTIFICATE OF CORRECTION

PATENT NO. : 5,248,762
DATED : September 28, 1993
INVENTOR(S) : Yamamoto et al

It is certified that error appears in the above-indentified patent and that said Letters Patent is hereby corrected as shown below:

Column 4, line 32, after "1,2-dimethylcyclopentane-" change "1,2-dioi," to --1,2-diol,--.

Column 5, line 17, after "When" insert --an--;
line 18, after "because" delete "said" and insert --the--.

Column 6, line 17, after "value" delete "ws" and insert --was--;
line 24, after "of" delete "GPCLALLS" and insert --GPC-LALLS--;
line 31, change "1H-NNR" to --1H-NMR--;
line 36, change "1H-NNR" to --1H-NMR--.

Signed and Sealed this

Eighteenth Day of October, 1994

Attest:

BRUCE LEHMAN

Attesting Officer

Commissioner of Patents and Trademarks